Patented Apr. 5, 1932

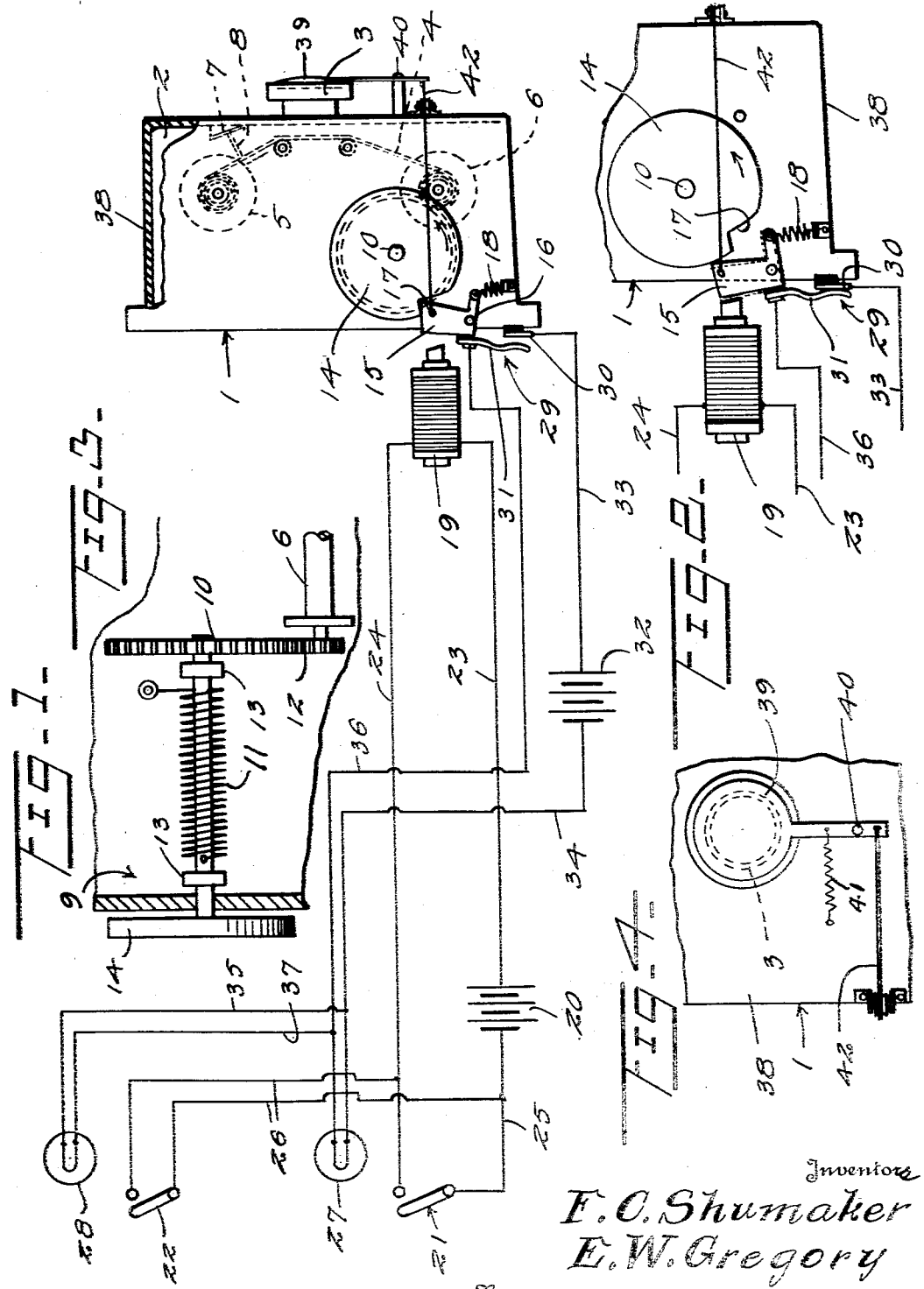

1,852,484

UNITED STATES PATENT OFFICE

FREDERIC C. SHUMAKER AND EMERSON W. GREGORY, OF SANGER, CALIFORNIA

APPARATUS FOR RECORDING AUDIBLE AND VISUAL EFFECTS OF COLLISIONS

Application filed October 19, 1929. Serial No. 401,005.

This invention relates to an apparatus for recording the audible and visual effects of an impending collision between an electric or steam locomotive or other car and an automobile, to the end that there may be presented at an inquiry or inquest evidence from which the cause of the accident and the person or persons responsible therefor may be ascertained.

The invention has for a further object to provide an apparatus of the character stated which shall include a combined motion picture camera and sound recorder having a wide vision lens and adapted to be mounted upon a locomotive or the like in such position as to permit the photographing, in advance of the locomotive, of a tract of ground greater in width than and including the railway and to permit the recording of the sounding of the locomotive whistle and other audible effects of a collision.

The invention has for a further object to provide an apparatus of the character stated wherein the combined motion picture camera and sound recorder shall be so mounted upon the locomotive or the like as to protect the mechanism thereof from injury by and as a result of the vibrating of the locomotive.

The invention has for a further object to provide an apparatus of the character stated which shall include a motor for the combined motion picture camera and sound recorder and adapted to be set in operation by either the engineer or fireman of the locomotive.

The invention has for a further object to provide an apparatus of the character stated which shall include a shield for the lens normally occupying a position across the lens and adapted to be moved into a position beyond the lens by and as the result of the operation of the motor.

The invention has for a still further object to provide an apparatus of the character stated which shall include electrically operated means for controlling the motor and control switches for said means located one at the engineer's side and the other at the fireman's side of the locomotive cab so as to permit the motor to be set in operation by either the engineer or fireman.

The invention is hereinafter more fully described and claimed, and illustrated in the accompanying drawings, wherein:—

Figure 1 is a view partly elevational and partly diagrammatic of the apparatus with the motor control means in active position;

Figure 2 is a view somewhat similar to Figure 1 with the motor control means in inactive position;

Figure 3 is a sectional view illustrating the motor of the apparatus, and

Figure 4 is a front view illustrating the lens shield.

The apparatus comprises a combined motion picture camera and sound recorder 1 which may be any well known or appropriate construction and is shown as embodying a casing 2, a lens 3, a film 4 and film spools 5 and 6. The lens 3 is of wide vision type, and the film 4 may be and preferably is of the type in which may be formed sound wave recording grooves. Any well known means, such as a diaphragm 7 and a stylus 8, may be employed for forming sound wave recording grooves in the film 4. The film 4 is unwound from the spool 5 on to the spool 6 during the operation of the camera and recorder 1, and during the movement thereof, the pictures recorded and the sound wave recording proof is formed.

A spring motor 9 is employed for the purpose of operating the camera and the recorder 1. It may be any well known or appropriate construction, and is shown as embodying a shaft 10, a spring 11 coiled about the shaft and secured at one end thereto and at its other end to the casing 2, and gears 12 establishing a driving connection between the shaft and the spool 6. Bearings 13 are secured to one wall of the casing 2. A notched disc 14 fixed to the shaft 10 and a pawl 15 pivoted at its lower end, as at 16, to the casing 2 and having its upper or free end engaging in the notch 17 of the disc, constitute means for releasably holding the motor against operation. The pawl 15 is normally held in engagement in the notch 17 by a spring 18, and it is adapted to be retracted or withdrawn from the notch through the medium of an electromagnet 19.

The electromagnet 19 is included in a circuit which comprises a battery 20, switches 21 and 22, a conductor 23 extending from one pole of the battery to one terminal of the winding electromagnet, and conductor 24 extending from the other terminal of the electromagnet to one of the contacts of the switch 21, and a conductor 25 extending from the other pole of the battery with the other contact of the switch. The switch 22 has its contact connected to the conductors 24 and 25 by conductors 26. The switches 21 and 22 are preferably of the push button type, and one will be arranged within the locomotive cab at the engineer's side and the other in the cab at the fireman's side whereby to permit either the engineer or fireman to close the circuit of the electromagnet 19 when it appears to either that there is likelihood of a collision between the locomotive and an automobile approaching the roadway. The closing of this circuit results in the retraction of the pawl 15, and the retraction of the pawl permits the motor to operate the camera and recorder 1 which will be preferably mounted on the front of the locomotive below the headlight. The location of the camera and recorder 1 and the wide range lens 3 will permit the photographing of a tract of ground greater in width than and including the railway in advance of the locomotive, together with the grade-crossing on both sides of the railway. The sounding of the whistle of the locomotive, together with other sounds incident to a collision, should one take place, will be recorded on the film by the diaphragm 7 and stylus 8.

The pawl 15 is retracted by the electromagnet 19 against the tension of the spring 18, and it is held retracted by the disc 14 during such time as it requires the disc to make one complete rotation. In view thereof, it is only necessary for the engineer or fireman to press and immediately thereafter release his switch. On the retraction of the pawl 15 as the result of the closing of one of the switches 21 and 22, the disc 14 rotates in the direction indicated by the arrows of Figures 1 and 2, and when the switch is released, the pawl is moved into and held in contact with the periphery of the disc by the spring 18. When the disc 14 completes its rotation, the pawl 15 is moved into the notch 17 by the spring 18, with the result that the operation of the motor 9 and the camera and recorder 1 is stopped. As the size of the disc 14 controls the operating period of the motor 9 and camera and recorder 1, it will be understood that these parts may be caused to operate for any desired or required period of time by equipping the shaft 10 with the disc of the required size.

To enable the engineer or fireman to ascertain whether the closing of this switch results in the retraction of the pawl 15, telltale lamps 27 and 28 are provided, one of these lamps will be mounted on the engineer's side and the other on the fireman's side of the locomotive. The lamps 27 and 28 are under the control of a switch 29 which is automatically closed by the retraction of the pawl 15 and automatically opened by the projection of the pawl into the disc notch 17. The switch 29 includes a fixed contact 30 secured to and insulated from the casing 2 and a movable spring of the contact 31 fixed to and insulated from the pawl 15.

Current for the lamps 27 and 28 is provided by a battery 32, one pole of the battery being connected to the contact 30 by a conductor 33 and the other pole being connected to the lamps 27 and 28 by conductors 34 and 35. The contact 31 is connected to the lamps 27 and 28 and conductors 36 and 37. It will be seen that when either of the switches 21 and 22 is closed, the resulting retraction of the pawl 15 will close the switch 29, and that the closing of the switch will result in the lighting of both the lamps 27 and 28. After the disc 14 has made one complete rotation, the switch 29 will be opened by the projection of the pawl 15 into the notch 17 by the spring 18.

The casing 2 is provided with a jacket 38 which is adapted to protect the parts of the camera and recorder 1 from shocks and jars as the result of the vibration of the locomotive.

The lens 3 is provided with a shield 39 which is pivotally mounted, as at 40, for movement into and out of lens protecting position. Any suitable means may be provided for normally holding the shield 39 in lens protecting position and for releasing it for movement into lens uncovering position immediately for the operation of the camera and recorder 1. If desired, this means may consist of a spring 41 serving to normally hold the shield 39 in lens protecting position, and a cable 42 connected to the shield and to the pawl 15 so as to permit the retraction of the pawl to move the shield into lens uncovering position. The shield 39 will be moved into this position against the tension of the spring 41, and will be returned to its normal position by the spring on the projection of the pawl 15.

From the foregoing description, taken in connection with the accompanying drawings, it will be apparent that we have provided novel, durable and highly efficient apparatus for recording the audible and visual effects of an impending collision between a locomotive and an automobile, and that the apparatus may be used on a steam or other locomotive or on an urban or interurban electric car or the like. It will also be understood that a suitable casing will be provided for the disc 14, pawl 15, spring 18, electromagnet 19 and switch 29, and that the conductors and cable 42 may be mounted in flexible metal sheets.

While we have described the principle of our invention, together with the structure which we now consider the preferred embodiment thereof, it is to be understood that the structure shown is merely illustrative and that such changes may be made, when desired, as fall within the scope of the invention as claimed.

We claim:—

1. An apparatus of the character set forth, comprising a combined motion picture camera and sound recorder, a spring motor having a shaft operatively connected to the camera and recorder, a notched disc fixed to the shaft, a pivoted pawl engaging in the notch of the disc to hold the motor against operation, a spring holding the pawl in the notch of the disc, an electromagnet adapted when energized to retract the pawl, an electric circuit including the electromagnet, switches in said circuit remote from the camera and recorder, telltale lamps located near the switches, an electric circuit including the lamps, and a switch in said second circuit near the camera and recorder and under the control of the pawl and adapted to be held open by the pawl when the latter is in normal position and closed by the pawl when the latter is in retracted position.

2. An apparatus of the character set forth, comprising a motion picture camera, a motor having a shaft operatively connected to the camera, a notched disk fixed to the shaft, a pivoted pawl engaging in the notch of the disk to hold the motor against operation, a spring holding the pawl in the notch of the disk, an electromagnet adapted when energized to retract the pawl, an electric circuit including the electromagnet, a switch in said circuit remote from the camera, a telltale lamp located near the switch, an electric circuit including the lamp, and a switch in said circuit near the camera and under the control of the pawl and adapted to be held open by the pawl when the latter is in engagement with the notch in the disk and closed by the pawl when the latter is retracted from engagement with the disk.

3. An apparatus of the character set forth, comprising a motion picture camera, a motor having a shaft operatively connected to the camera, a notched disk fixed to the shaft, a pivoted pawl engaging in the notch of the disk to hold the motor against operation, a spring holding the pawl in the notch of the disk, an electromagnet adapted when energized to retract the pawl, an electric circuit including the electromagnet, a switch in said circuit remote from the camera, a telltale lamp located near the switch, an electric circuit including the lamp, a switch in said circuit near the camera and under the control of the pawl and adapted to be held open by the pawl when the latter is in engagement with the notch in the disk and closed by the pawl when the latter is retracted from engagement with the disk, a shield for the lens of the camera, and means connecting the shield to the pawl for movement by the pawl into lens uncovering position during the retraction of the pawl.

In testimony whereof we hereunto affix our signatures.

FREDERIC C. SHUMAKER.
EMERSON W. GREGORY.